J. T. GARTON.
WINDMILL.
APPLICATION FILED APR. 29, 1913.
1,087,756.
Patented Feb. 17, 1914.
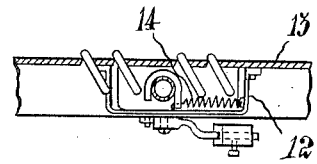
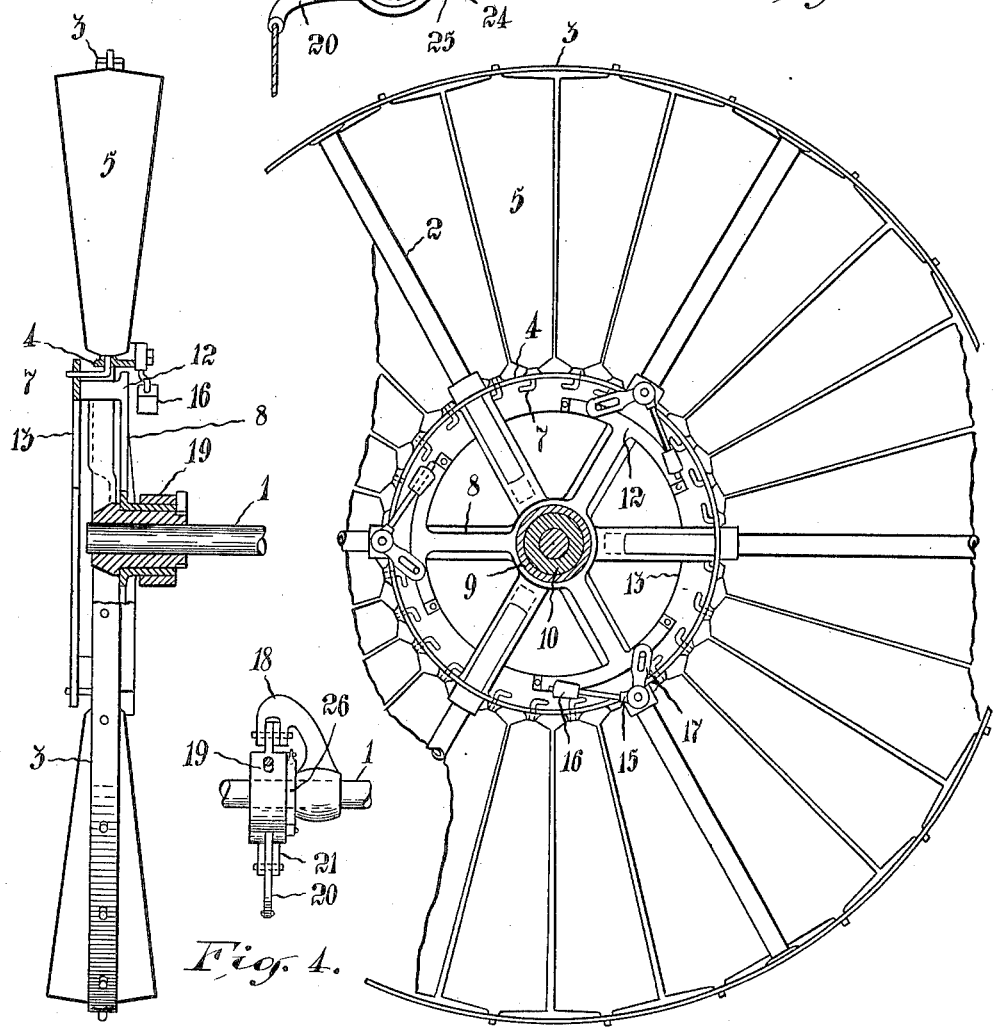

UNITED STATES PATENT OFFICE.

JOHN T. GARTON, OF TORONTO, ONTARIO, CANADA.

WINDMILL.

1,087,756. Specification of Letters Patent. Patented Feb. 17, 1914.

Application filed April 29, 1913. Serial No. 764,445.

*To all whom it may concern:*

Be it known that I, JOHN T. GARTON, of the city of Toronto, in the Province of Ontario, Canada, have invented certain new and useful Improvements in Windmills, of which the following is a specification.

This invention relates to windmills in which the wheel is provided with a plurality of sails or blades set at an angle to the plane of the windmill, and my object is to devise means for automatically reefing the blades according to the strength of the wind by varying the angle of said blades to the wind and also to provide means whereby the momentum of the wheel itself may be utilized to move the blades to a position parallel to the axis of the wheel and retain them in that position when the wheel is to be "held out of the wind" to stop it.

I attain my object by pivoting each blade on a longitudinal axis radial of the wheel and by providing the inner pivot of each blade with a crank arm engaging in holes in the rim of a governor wheel journaled on the axis of the wind wheel. This governor wheel is actuated by centrifugal governors to turn the blades whereby any increase of speed above a predetermined maximum reduces the angle of the blades to the wind, and thus reduces the effect of the wind on the wheel. Means are also provided to brake the governor wheel and thus allow the wind wheel to travel ahead and cause the blades to assume a position parallel to the axis of the wind wheel, and to lock the windwheel against backward rotation which would move the blades back to working position, all substantially as hereinafter described and illustrated in the accompanying drawings in which—

Figure 1 is a front elevation partly broken away of a wheel constructed in accordance with my invention. Fig. 2 is a cross section of the same. Fig. 3 is a detail showing the spring of the governing device. Fig. 4 is a plan view of the mechanism for holding the wheel out of the wind, and Fig. 5 a front elevation of the same.

In the drawings like numerals of reference indicate corresponding parts in the different figures.

1 is the axis of the wheel which will be supported in the ordinary manner. The wheel itself comprises the spokes 2 carrying the rings 3 and 4. The blades 5 are pivoted in these rings on longitudinal axes radial of the wheel. The inner pivot of each blade extends through the inner ring 3 and is bent to form a crank arm 7. Each crank arm is engaged with the rim of a governor wheel 8, preferably by being extended through a hole in the rim of the wheel. The hub 9 of this governor wheel is journaled on the hub 10 of the windmill wheel. Each spoke of the governor wheel has a bridge 12 formed at its end offset at each end and secured to the rim 13. The rim is thus brought into suitable position to engage the crank arms 7. A coil spring 14 is located under each bridge, one end being connected with a spoke or other suitable part of the windmill wheel and the other end connected with the bridge. (See Fig. 3). These springs tend to rotate the governor wheel 8 to the position in which the blades 5 are in their normal position. The governor wheel is rotated in the opposite direction to reef the wheel by means of centrifugal governing devices. Two or more of these devices are preferably employed, each comprising a bent lever 15 fulcrumed intermediate its ends on the windmill wheel. One end of the bent lever 15 has a weight 16 secured thereto. The other by means of a pin and slot connection 17 engages the governor wheel.

It is evident that if the speed of the wheel through an increase of the wind's velocity increases beyond a predetermined maximum the governors will overcome more or less the tension of the springs 14 until the blades reach an angle where the effect of the wind is reduced sufficiently to prevent its increase affecting the wheel. As the wind decreases, the speed of the wheel decreases, and the governors are drawn in by the action of the springs and the blades assume their normal angle of maximum efficiency for light winds.

To provide means for holding the blades with their edges presented to the wind to stop the wheel, I provide the following mechanism: On a bracket 18 secured to the axis 1, which is stationary, I pivot the brake shoes 19 on a common pivot. A lever 20 is pivoted to the end of the lower brake shoe. The upper brake shoe has a link 21 pivoted to its end, the other end of the link being pivoted to the lever 20 intermediate its ends. It is evident that by rocking the lever 20 the brake shoes may be forcibly applied to the hub of the governor wheel or released therefrom. To insure the upper brake shoe lifting properly I may extend an arm 22 therefrom provided with the counterbalancing weight 23 which tends to lift the brake shoe from the hub. I also provide a shoulder 24 on the bracket 18 with which a shoulder 25 on the lower brake shoe 19 is adapted to engage when the latter has swung a predetermined distance away from the hub of the governor wheel. When the lower brake shoe has dropped to its limit any further rocking movement of the lever 20 operates to lift the upper brake shoe 19. The effect of applying the brake shoes is to hold back the governor wheel. The windmill wheel under its momentum moves ahead of the governor wheel and the blades are turned edgewise to the wind. The wheel soon slows down and if the governor wheel be clamped by the brakes the windmill wheel would ultimately turn backward under the influence of the springs 14 and present the blades again at an angle to the wind. To prevent this occurring I provide the pawl 26, preferably pivoted on the upper brake shoe 19. This pawl is adapted to engage with the ratchet wheel 27 formed on the hub of the windmill wheel. When the windmill is running this pawl is held clear of the ratchet wheel owing to the fact that its end rests on a pin 28 on the upper brake shoe. When the brake shoes are applied to the hub of the governor wheel the pawl comes into operation and rides over the teeth of the ratchet wheel until the windmill wheel comes to a stop, when it engages one of the teeth and effectively prevents backward rotation. As long as the brake is applied the blades will be held edgewise to the wind. As soon, however, as the brake is released the dog is also lifted from the ratchet wheel and the blades of the windmill wheel are allowed to resume their normal working position dependent on the strength of the wind.

What I claim as my invention is:

1. A windmill wheel provided with two rings; a hub and spokes connecting the hub and the rings; a sleeve hub journaled on said hub at one side of the spokes; a governor wheel rim located at the other side of said spokes; spokes connected to said sleeve each having a bridge formed at its end straddling one of the spokes of the windmill wheel and secured to the governor wheel rim; blades pivoted in the aforesaid rings on longitudinal axes radial of the wheel; connections whereby the governor wheel is adapted to rock the said blades; and centrifugal governing means adapted to rotate said governor wheel.

2. A windmill wheel provided with two rings; a hub and spokes connecting the hub and the rings; a sleeve hub journaled on said hub at one side of the spokes; a governor wheel rim located at the other side of said spokes; spokes connected to said sleeve each having a bridge formed at its end straddling one of the spokes of the windmill wheel and secured to the governor wheel rim; blades pivoted in the aforesaid rings on longitudinal axes radial of the wheel; connections whereby the governor wheel is adapted to rock the said blades; centrifugal governing means adapted to rotate said governor wheel; and a coil spring located under a bridge and connected with a part of the windmill wheel and a part of the governor wheel.

3. A windmill wheel provided with two rings; blades pivoted in said rings on longitudinal axes radial of the wheel; cranks connected to the inner pivots of the blades; a governor wheel journaled concentric with the windmill wheel and operatively connected with said cranks; centrifugal governing means adapted to rotate said governor wheel; a friction brake applicable to the governor wheel; and a ratchet device to prevent the backward rotation of the windmill wheel.

4. A windmill wheel provided with two rings; a hub and spokes connecting the hub and the rings; a sleeve hub journaled on said hub at one side of the spokes; a governor wheel rim located at the other side of said spokes; spokes connected to said sleeve each having a bridge formed at its end straddling one of the spokes of the windmill wheel and secured to the governor wheel rim; blades pivoted in the aforesaid rings on longitudinal axes radial of the wheel; connections whereby the governor wheel is adapted to rock the said blades; and a bell crank lever pivoted on the inner ring of the windmill wheel having one arm weighted and having its other arm operatively connected with one of the aforesaid bridges whereby the said lever may rotate said governor wheel.

5. A windmill wheel provided with blades pivoted on longitudinal axes radial of the wheel; centrifugal governing means controlling the angle of the blades relative to the axis of the windmill wheel including a wheel rotatable relative to the windmill wheel; means for braking the governor wheel; and means for preventing backward movement of the windmill wheel.

6. A windmill wheel provided with blades pivoted on longitudinal axes radial of the wheel; centrifugal governing means controlling the angle of the blades relative to the axis of the windmill wheel including a wheel rotatable relative to the windmill wheel; a brakeshoe movable to brake the governor wheel; a ratchet wheel secured to the windmill wheel; and a pawl carried by the brake shoe so that when the brake shoe is in its braking position the pawl is positioned to engage the ratchet wheel.

7. The combination of an axle; a windmill wheel having a hub journaled on said axle; blades pivoted on longitudinal axes radial of the wheel; a governor wheel having a hub rotatable on the hub of the windmill wheel and adapted to rock said blades; centrifugal governing means adapted to rotate said governor wheel; a brake shoe pivoted on a stationary part and adapted to engage the hub of the governor wheel; a ratchet wheel secured to the hub of the windmill wheel; a pawl pivoted on the brake shoe; and means limiting the downward drop of the pawl, the said pawl being engageable with the ratchet wheel when the brake shoe is applied to the hub of the governor wheel.

8. The combination of an axle; a windmill wheel having a hub journaled on said axle; blades pivoted on longitudinal axes radial of the wheel; a governor wheel having a hub rotatable on the hub of the windmill wheel and adapted to rock said blades; centrifugal governing means adapted to rotate said governor wheel; a pair of brake shoes one above and one below the axle pivoted on a stationary part and adapted to engage the hub of the governor wheel; a ratchet wheel secured to the hub of the windmill wheel; a pawl pivoted on the upper brake shoe; means limiting the downward drop of the pawl, the said pawl being engageable with the ratchet wheel when the brake shoe is applied to the hub of the governor wheel; and lever and link mechanism for simultaneously operating the brake shoes.

9. The combination of an axle; a windmill wheel having a hub journaled on said axle; blades pivoted on longitudinal axes radial of the wheel; a governor wheel having a hub rotatable on the hub of the windmill wheel and adapted to rock said blades; centrifugal governing means adapted to rotate said governor wheel; a pair of brake shoes one above and one below the axle pivoted on a stationary part and adapted to engage the hub of the governor wheel; a ratchet wheel secured to the hub of the windmill wheel; a pawl pivoted on the upper brake shoe; means limiting the downward drop of the pawl, the said pawl being engageable with the ratchet wheel when the brake shoe is applied to the hub of the governor wheel; lever and link mechanism for simultaneously operating the brake shoes; and a stationary shoulder with which the lower brake shoe is adapted to engage to limit its movement away from the hub.

10. The combination of an axle; a windmill wheel having a hub journaled on said axle; blades pivoted on longitudinal axes radial of the wheel; a governor wheel having a hub rotatable on the hub of the windmill wheel and adapted to rock said blades; centrifugal governing means adapted to rotate said governor wheel; a pair of brake shoes one above and one below the axle pivoted on a stationary part and adapted to engage the hub of the governor wheel; a ratchet wheel secured to the hub of the windmill wheel; a pawl pivoted on the upper brake shoe; means limiting the downward drop of the pawl, the said pawl being engageable with the ratchet wheel when the brake shoe is applied to the hub of the governor wheel; lever and link mechanism for simultaneously operating the brake shoes; and counterbalancing means tending to lift the upper brake shoe.

11. The combination of an axle; a windmill wheel having a hub journaled on said axle; blades pivoted on longitudinal axes radial of the wheel; a governor wheel having a hub rotatable on the hub of the windmill wheel and adapted to rock said blades; centrifugal governing means adapted to rotate said governor wheel; a pair of brake shoes one above and one below the axle pivoted on a stationary part and adapted to engage the hub of the governor wheel; a ratchet wheel secured to the hub of the windmill wheel; a pawl pivoted on the upper brake shoe; means limiting the downward drop of the pawl, the said pawl being engageable with the ratchet wheel when the brake shoe is applied to the hub of the governor wheel; lever and link mechanism for simultaneously operating the brake shoes; a stationary shoulder with which the lower brake shoe is adapted to engage to limit its movement away from the hub; and counterbalancing means tending to lift the upper brake shoe.

Toronto, Ont. this 22nd day of April, 1913.

JOHN T. GARTON.

Signed in the presence of—
  J. EDW. MAYBEE,
  D. S. TOVELL.